United States Patent [19]

Klemer et al.

[11] Patent Number: 5,095,629
[45] Date of Patent: Mar. 17, 1992

[54] LASER BEAM TARGET

[75] Inventors: Daniel R. Klemer, New Carlisle; Mark D. Sobottke, Kettering; Ted L. Teach, Dayton, all of Ohio

[73] Assignee: Spectra-Physics Laserplane, Inc., Dayton, Ohio

[21] Appl. No.: 648,559

[22] Filed: Jan. 31, 1991

[51] Int. Cl.⁵ .................. G01C 15/00; G01B 11/00
[52] U.S. Cl. ............................ 33/293; 33/DIG. 21; 356/399; 362/259
[58] Field of Search ............... 33/290, 293–295, 33/DIG. 21; 350/127–129; 356/399; 362/259, 339

[56] References Cited

U.S. PATENT DOCUMENTS

| | | |
|---|---|---|
| 563,836 | 7/1896 | Blondel et al. |
| 2,726,573 | 12/1955 | Maloff .................... 350/127 |
| 3,588,255 | 6/1971 | Alexander . |
| 3,778,169 | 12/1973 | Adams .................... 356/399 |
| 3,898,743 | 8/1975 | Myeress .................. 33/293 |
| 4,155,648 | 5/1979 | Fergusen ............... 33/293 X |
| 4,319,406 | 3/1982 | Peterson, Sr. et al. |
| 4,418,986 | 12/1983 | Yata et al. ........... 350/129 X |
| 4,681,439 | 7/1987 | Shoemaker ........... 33/293 X |
| 4,911,529 | 3/1990 | Van De Ven .......... 350/127 |
| 4,919,518 | 4/1990 | Ogino et al. .......... 350/128 |
| 4,927,262 | 5/1990 | Schwartz ............... 353/13 |
| 4,968,147 | 11/1990 | Shoemaker ........... 33/293 X |
| 4,970,794 | 11/1990 | Buckley ............... 33/293 |

OTHER PUBLICATIONS

945-V Laserlevel, Spectra-Physics, Inc., 1983.
910 Laserlevel, Spectra-Physics Inc., 1984.
942 Laserlevel, Spectra-Physics Inc., 1987.
1160 Dialgrade, Spectra-Physics, Inc., 1984.

*Primary Examiner*—William A. Cuchlinski, Jr.
*Assistant Examiner*—Alvin Wirthlin
*Attorney, Agent, or Firm*—Killworth, Gottman, Hagan & Schaeff

[57] ABSTRACT

A laser beam target for use with a projector capable of providing a reference laser beam of light traveling in a predetermined path is provided and includes a main body portion having first and second surfaces. A plurality of projections are provided on at least one of the first and second surfaces for directing at least a portion of the reference beam of light into a specific range of vertical viewing angles away from the path of the beam as the light passes from the body, thereby permitting a worker viewing the target to more easily determine when the reference beam of light is in alignment with appropriate reference indicia on the target.

24 Claims, 8 Drawing Sheets

LASER BEAM TARGET

BACKGROUND OF THE INVENTION

The present invention relates generally to a laser beam target for use with an apparatus capable of emitting a reference laser beam of light along a predetermined path and, more particularly, to such a laser beam target which includes a plurality of projections on at least one surface thereof for directing at least a portion of the laser beam of light into a specific range of viewing angles away from the path.

Reference laser beam systems have been employed in the past in numerous surveying and construction applications. In one such system, a laser beam projector provides a stationary laser beam which establishes a reference line of light. In use, the projector may, for example, be located in a construction site at a desired grade for laying sections of pipe. A laser beam target may be placed within each section of pipe being laid in order to assist the workers in determining the proper position for each section. By aligning the reference line of light with reference indicia on the target, each section can be properly positioned at the site.

In a further system, a laser beam projector provides a rotating laser beam which establishes a reference plane. In use, the projector may, for example, be mounted at or near the desired height of a hanging ceiling grid in a building under construction. The beam is rotated in a horizontal plane to provide a continuous, visible plane of light that creates a constant horizontal benchmark of elevation over the entire work area. A laser beam target may be mounted onto the ceiling grid in order to assist workers in determining the proper height for the ceiling throughout the room. The ceiling grid is leveled and mounted at the proper height by lining up reference indicia on the laser beam target with the rotating laser beam. Such a system has also been used for aligning drywall.

It is known in the prior art to provide a textured or ground surface on a laser beam target for diffusing an incoming beam of light symmetrically about the beam's axis to permit viewing of the beam striking the target from off-beam-axis positions. It is also known in the prior art to include glass fibers embedded within a laser beam target to diffuse an incoming beam of light symmetrically about the beam's axis to also permit viewing of the beam striking the target from off-beam-axis positions.

It is has been found that it is sometimes difficult to determine when a rotating beam or a reference line of light is in alignment with reference indicia located on one of the above-discussed prior art laser beam targets. Each prior art target diffuses an incoming beam of light into a broad range of viewing angles wherein the range is symmetrical about the beam's axis. As a result, the user receives only a very small fraction of the available beam power when viewing the target from a comfortably accessible off-beam-axis position, and thus sees a very dim image of the beam where it strikes the target. The remaining available beam power is wasted in unused directions. Thus, if a laser beam target is mounted in a pipe, a worker lining up the target with the reference line of light must position himself so that his line of sight is substantially in line with the path of travel of the reference light if he desires to increase the visibility of the reference beam of light on the target. This may result in the worker locating himself in an awkward position to line up the target with the reference line of light. Likewise, if a laser beam target is mounted on an overhead ceiling grid, a worker lining up the target with the laser beam must position himself so that his line of sight is substantially in the same plane as the rotating laser beam if he desires to increase the visibility of the reference beam of light on the target. This may also result in the worker having to position himself in an awkward position, e.g., on a supporting object, in order to line up the target with the laser beam.

Accordingly, a need exists for an improved laser beam target which is capable of directing a major portion of a reference beam of light emitted from a projector into a specific range of viewing angles away from its path of travel which includes positions easily accessible to the eyes of a worker viewing the target, thereby permitting a worker viewing the target to more easily determine when the reference beam of light is in alignment with appropriate indicia on the target.

SUMMARY OF THE INVENTION

This need is met by a laser beam target in accordance with the present invention which includes a body having a plurality of projections on at least one side thereof for directing a major portion of a reference beam of light emitted from a projector into a specific range of viewing angles away from the beam's path of travel as the beam passes from the target. This target permits a worker viewing the target to more easily determine when the reference beam of light is in alignment with appropriate indicia on the target.

In accordance with a first aspect of the present invention, a reference target for use with a projector capable of emitting a reference beam of light along a predetermined path is provided and comprises: a body having first and second substantially planar surfaces, the reference beam of light passing through the first and second planar surfaces when the body enters into the path of the beam of light; and, light diverting means on at least one of the first and second surfaces of the body for directing at least a portion of the beam of light into a specific range of viewing angles away from the path as the beam of light passes from the body.

The body preferably is formed from a polymeric material selected from the group consisting of acrylic resins and polycarbonates.

In a first embodiment of the laser target of the present invention, the light diverting means comprises a plurality of projections located on one of the first and second surfaces for reflecting and refracting a portion of the beam of light into a specific range of vertical viewing angles. Each of the projections preferably includes a substantially flat portion, an opposed arcuate portion, and a peak interconnecting portion interposed therebetween. The arcuate portion has a radius of curvature causing rays of the portion of the beam of light to be internally reflected upwardly toward the flat portion where the rays are refracted into a specific range of vertical viewing angles as they exit through the flat portion.

The laser target of the first embodiment further includes means located on the other of the first and second surfaces of the body for diffusing the beam of light into a substantially cone-shaped beam. The diffusing means preferably comprises a textured surface on the other of the first and second surfaces. The laser target of the first embodiment may additionally include covering means connected to the body for covering and protecting the light diverting means.

In a second embodiment of the laser target of the present invention, the first surface is divided into first and second sections, and the second surface is divided into third and fourth sections. The first and third sections are substantially coextensive and backed upon one another, and the second and fourth sections are substantially coextensive and backed upon one another. Means are located on the fourth section for reflecting a portion of the beam of light away from the fourth section after the portion passes through the second section. The light diverting means comprising a plurality of first projections located on the second section and a plurality of second projections located on the third section. The first projections refract a portion of the beam of light into a specific range of viewing angles when the first surface is positioned to face the beam of light and after the beam passes through the second section and is reflected back toward the second section by the reflecting means on the fourth section. The second projections refract a portion of the beam of light into a specific range of viewing angles when the second surface is positioned to face the beam of light and the portion of the beam of light passes through the third section and out from the first section. The first section may include means for diffusing the beam of light into a substantially cone-shaped beam as it passes therethrough.

Each of the first projections preferably includes a substantially flat portion, an opposed arcuate portion, and a peak interconnecting portion interposed therebetween. The arcuate portion includes a radius of curvature causing rays of the beam of light to be refracted into a specific range of vertical viewing angles. Each of the second projections likewise includes a substantially flat portion, an opposed arcuate portion, and a peak interconnecting portion interposed therebetween. The arcuate portion on each of the second projections includes a radius of curvature causing rays of the beam of light to be refracted into a specific range of vertical viewing angles.

In accordance with a second aspect of the present invention, a laser target for use with a projector capable of providing a reference laser beam of light along a predetermined path is provided and comprises: a body having first and second surfaces, the reference beam of light passing through the first and second surfaces when the body enters into the path of the beam of light; and, light diverting means associated with the body for directing at least a portion of the beam of light into one or more specific directions away from the path as the beam of light passes from the body.

The light diverting means may comprise a plurality of projections on one of the first and second surfaces for reflecting, and refracting a portion of the beam of light as discussed above with respect to the first embodiment of the first aspect of the present invention. Alternatively, the light diverting means may comprise a plurality of first and second projections located on the first and second surfaces as discussed above with respect to the second embodiment of the first aspect of the present invention.

According to preferred embodiments, it is an object of the present invention to provide a laser beam target which is capable of directing a major portion of a reference beam of light emitted from a projector to only a selective range of viewing angles comfortably accessible to the user. It is a further object of the present invention to provide a laser beam target having a plurality of projections on at least one side thereof for directing at least a portion of a reference laser beam of light into a specific range of vertical viewing angles away from the beam's path of travel. It is another object of the present invention to provide a laser beam target capable of directing rays of a reference beam of light into a specific range of viewing angles comfortably accessible to the user, thereby greatly enhancing beam spot visibility per unit input beam power. This and other objects and advantages of the invention will be apparent from the following description, the accompanying drawings and the appended claims.

DETAILED DESCRIPTION OF THE INVENTION

Figure 1:
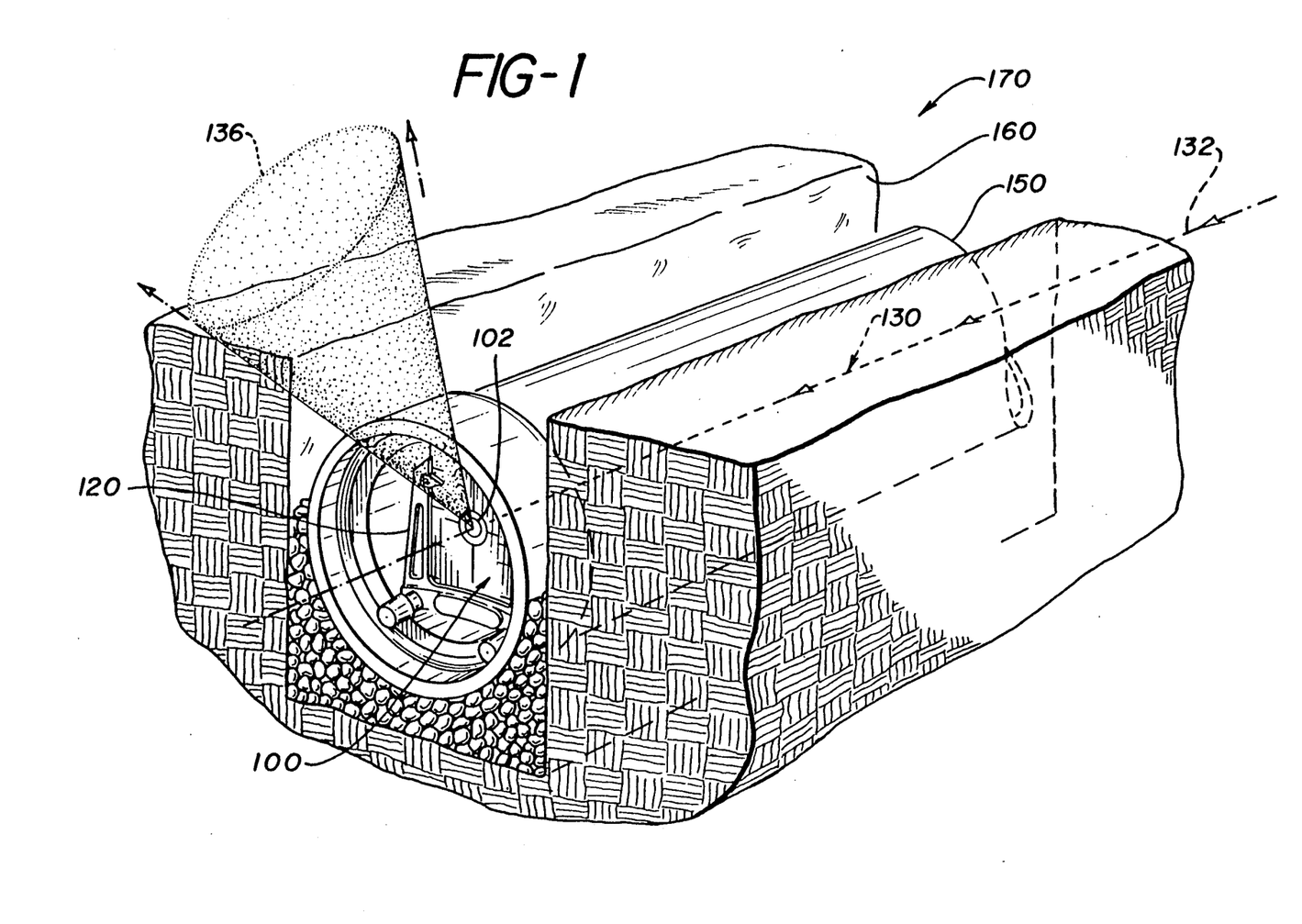
FIG. 1 is a pictorial view of a work site showing a first embodiment of a laser target of the present invention placed in a target stand which is located in a section of pipe being positioned in a trench and a laser beam passing through the target.

A first embodiment of a laser beam target of the present invention, generally designated by the reference numeral 100, is shown in FIG. 1 mounted in a supporting stand 120. The target 100 and the stand 120 are located in a pipe section 150, which is being positioned in a trench 160 at a construction site 170. A stationary laser beam 130, emitted from a laser projector (not shown), travels along a predetermined path 132 and passes through the target 100. Reference indicia 102 is provided on the target, as best shown in FIG. 2, which permits workers at the site 170 to locate the pipe section 150 at its proper position in the trench 160 by lining up the beam 130 with the reference indicia 102.

Figure 2:
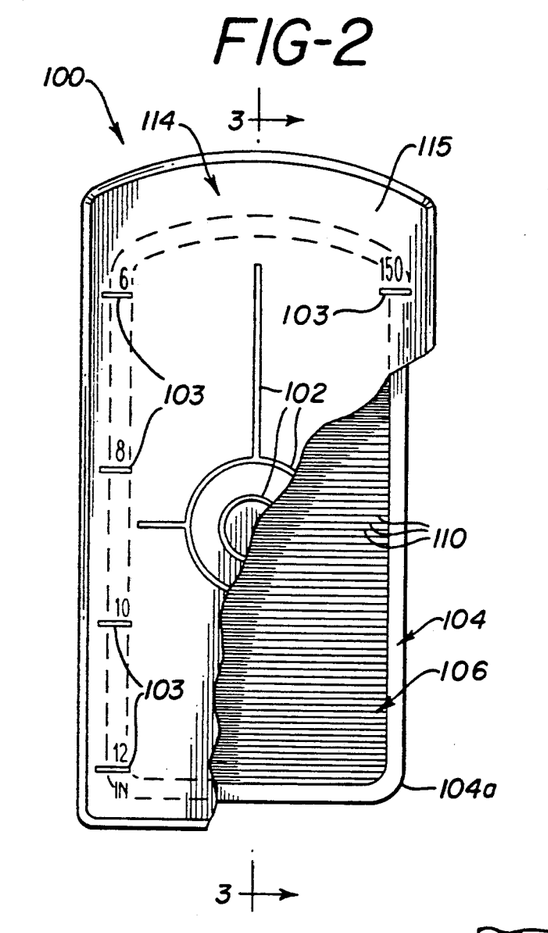
FIG. 2 is a front elevational view of the laser target shown in FIG. 1 with the cover portion partially broken-away.
Figure 3:
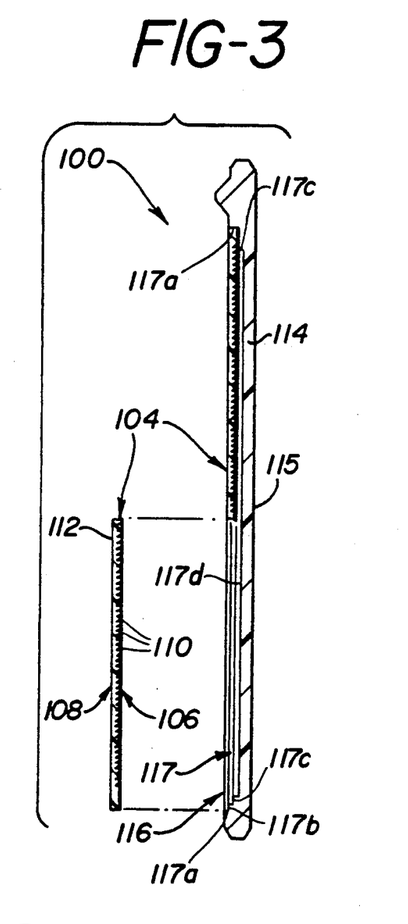
FIG. 3 is a cross-sectional view taken generally along section line 3—3 in FIG. 2 with the main body portion partially broken-away.
Figure 4:
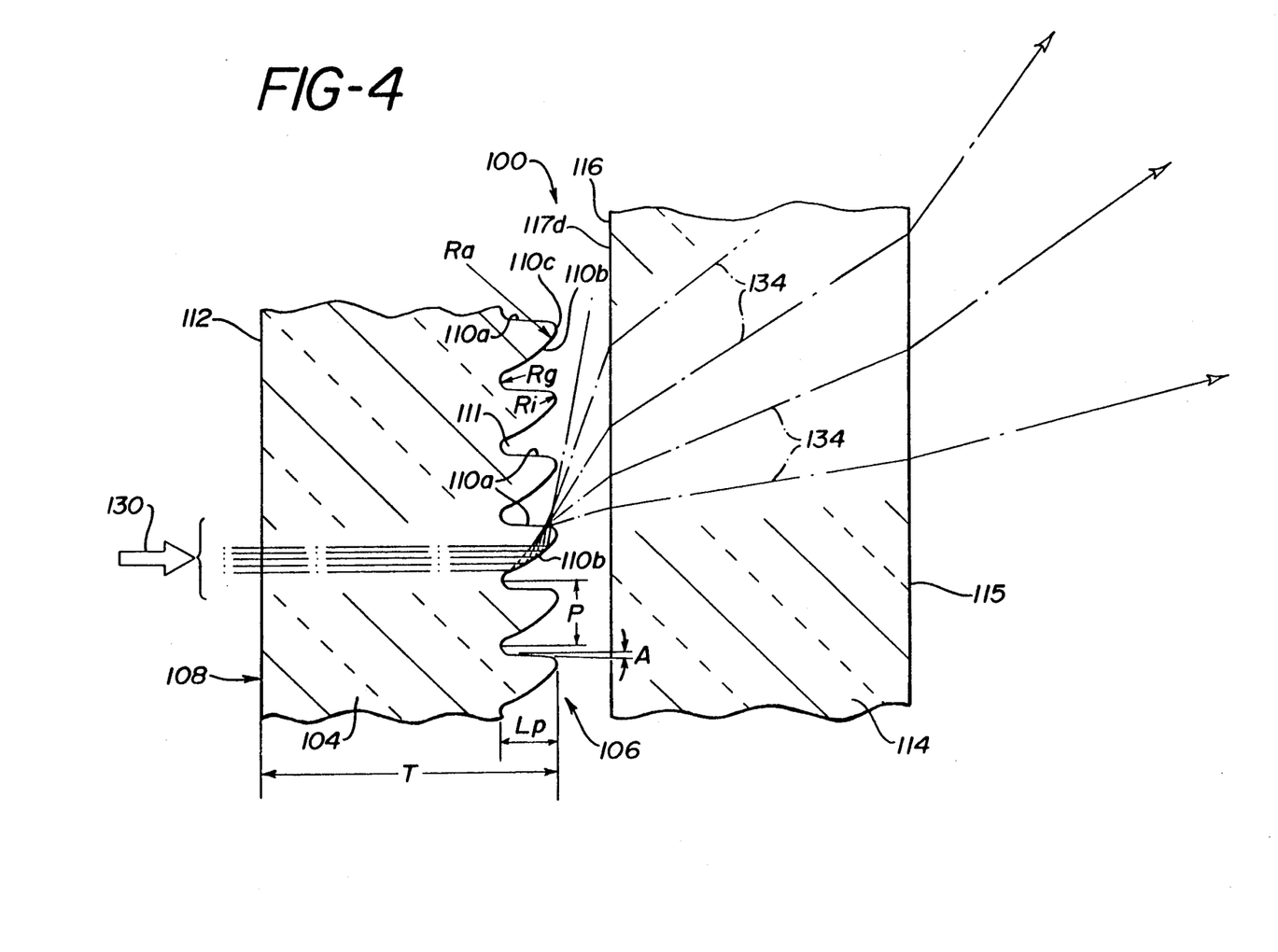
FIG. 4 is an enlarged cross-sectional view of a portion of the projections located on the first surface of the laser target shown in FIG. 1.

The target 100, as best shown in FIGS. 2–4, includes a main body portion 104 having first and second substantially planar surfaces 106 and 108, respectively. The body 104 preferably is molded or otherwise formed from a substantially transparent polymeric material, such as a transparent acrylic resin or polycarbonate. The polymeric material preferably has a long-wavelength-pass filter characteristic with a cutoff just below the wavelength $\lambda=633$ nm, which is the wavelength of a laser beam emitted from a common He-Ne laser. Using such material, most visible light will be blocked, while most (approximately 90%) of the laser beam light will pass through the material, thereby optimizing the contrast of the laser spot as viewed on the target 100. It is also contemplated by the present invention, that the body 104 may be formed from any other well-know substantially transparent material, e.g., glass.

A plurality of projections 110, also referred to herein as diverting means, are molded or otherwise formed into the first surface 106 of the body 104. The projections 110 serve to direct the beam of light 130 passing through the main body portion 104 into a specific range of vertical viewing angles away from the path 132 of the beam 130, as shown in FIG. 1. The specific range of viewing angles is controlled by the size and shape of the projections 110 on the first surface 106, as will be discussed in further detail below.

Referring to FIG. 4, each projection 110 preferably includes a substantially flat portion 110a, an opposed arcuate portion 110b, and a peak interconnecting portion 110c interposed therebetween. The arcuate portion 110b includes a radius of curvature Ra causing rays 134 of the beam 130 to be internally reflected upwardly toward the flat portion 110a, where the rays 134 are refracted into a specific range of vertical viewing angles as they exit through the flat portion 110a. As should be apparent to one skilled in the art, by changing the shape and size of the projections 110, one can cause the rays of the laser beam to be reflected and/or refracted into different specific viewing angle ranges.

The main body portion 104 further includes a textured surface 112, also referred to herein as diffusing means, on its second surface 108. The textured surface 112 serves to diffuse or spread the beam of light passing from the main body portion 104 into a cone-shaped beam 136, as shown in FIG. 1. This provides an angular viewing range from side-to-side.

Figure 3A:
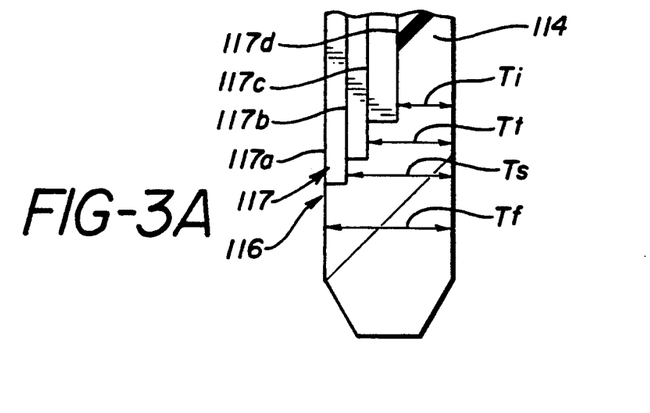
FIG. 3A is an enlarged cross-sectional view of the bottom portion of the cover of the target shown in FIG. 3.

The target 100 further includes a cover portion 114, which extends across the first surface 106 of the main body portion 104, and serves to protect the projections 110 on the first surface 106 from dirt, dust and the like. The cover portion 114 includes a smooth and polished outer surface 115 having the reference indicia 102 and positioning indicia 103 printed thereon. The cover portion 114 also includes an inner surface 116 having an inner recess 117 formed therein for receiving the main body portion 104. The outer periphery of the inner recess 117 is defined by a first step 117a, as shown in FIG. 3 and 3a, which is substantially coextensive with the outer peripheral edge 104a of the main body portion 104. Second and third steps 117b and 117c, respectively, are also provided on the inner surface 116 and are located within the outer periphery of the inner recess 117 defined by the first step 117a. When the main body portion 104 has been seated in the recess 117 defined by the first step 117a, the main body portion 104 and the cover portion 114 are connected together, such as by a well-known ultrasonic welding process. The second step 117b provides additional material for the welding process step and essentially becomes non-apparent after the welding step, as shown in the upper portion of FIG. 3. The third step 117c serves to provide clearance between the main body portion 104 and the inner surface 117d of the recess 117. The inner surface 117d of the recess 117 is preferably smooth and polished to prevent the rays 134 of the beam from being diffused as they pass therethrough.

As is apparent from FIG. 4, the cover portion 114 causes the rays 134 of the beam to be refracted as they pass therethrough. However, the direction of each ray 134 as it passes out of the cover portion 114 is substantially parallel to its direction just before it entered into the cover portion 114.

Figure 5:
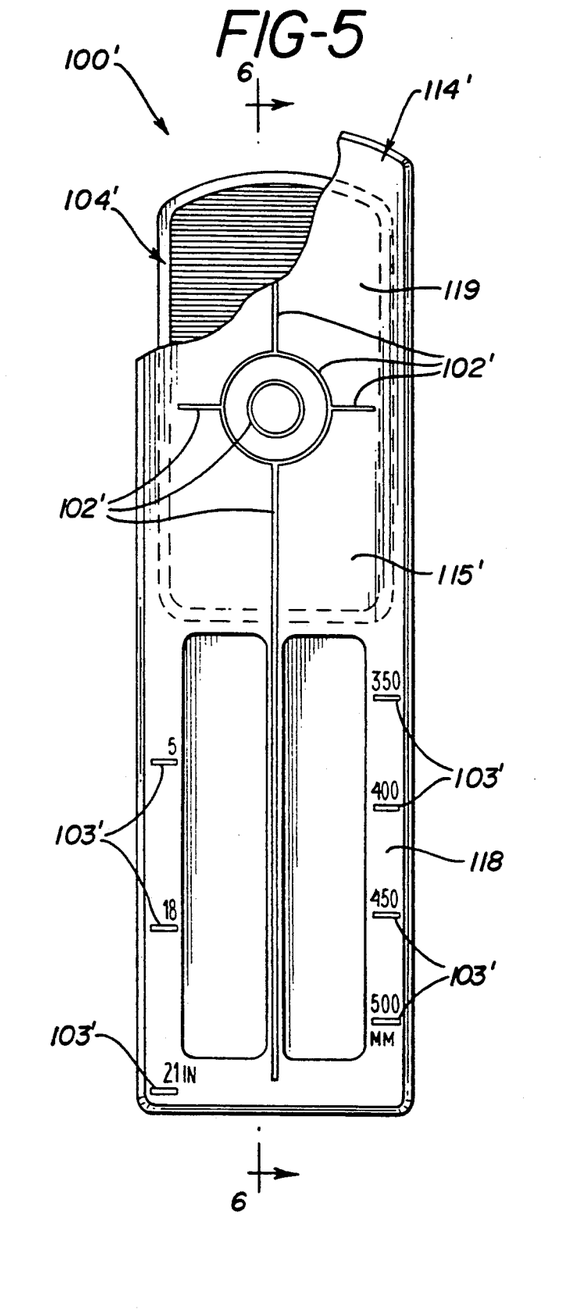
FIG. 5 is a front elevational view of a modification of the first embodiment of the laser target of the present invention with the cover portion partially broken-away.
Figure 6:
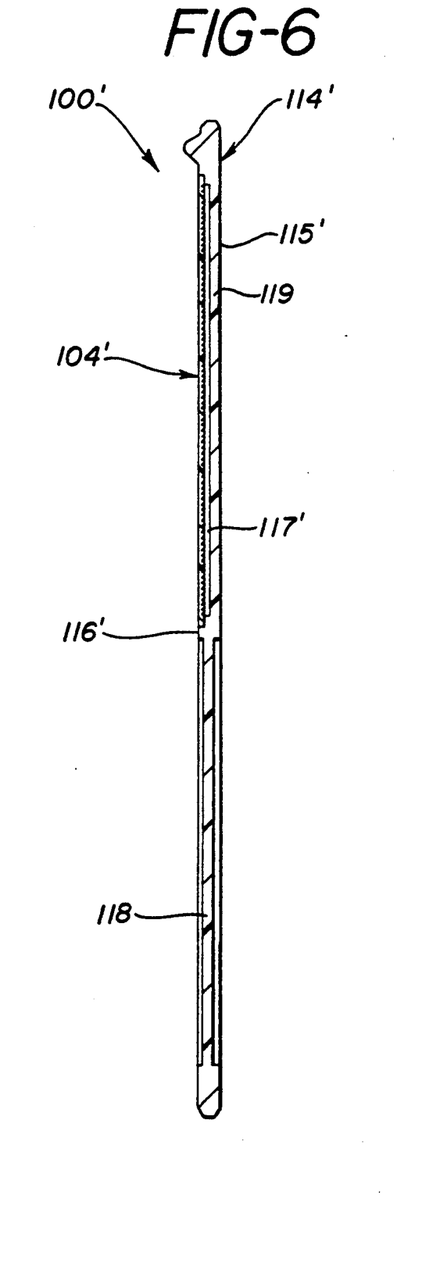
FIG. 6 is a cross-sectional view taken generally along section line 6—6 in FIG. 5.

A modification of the first embodiment of the laser target of the present invention is shown in FIGS. 5 and 6, and is designated by the reference numeral 100'. The target 100' includes a main body portion 104', which is substantially the same as the main body portion 104 shown in FIGS. 2–4. The cover portion 114' includes outer and inner surfaces 115' and 116', respectively. The inner surface 116' is formed with an inner recess 117', which has a shape and size similar to that of the inner recess 117 shown in FIG. 3. The main body portion 104' is received within the inner recess 117' of the cover portion 114', is preferably weldably connected thereto. The cover 114' also includes an elongated lower portion 118, which has positioning indicia 103' printed thereon, and an upper portion 119, which has reference indicia 102' printed thereon.

Figure 7:
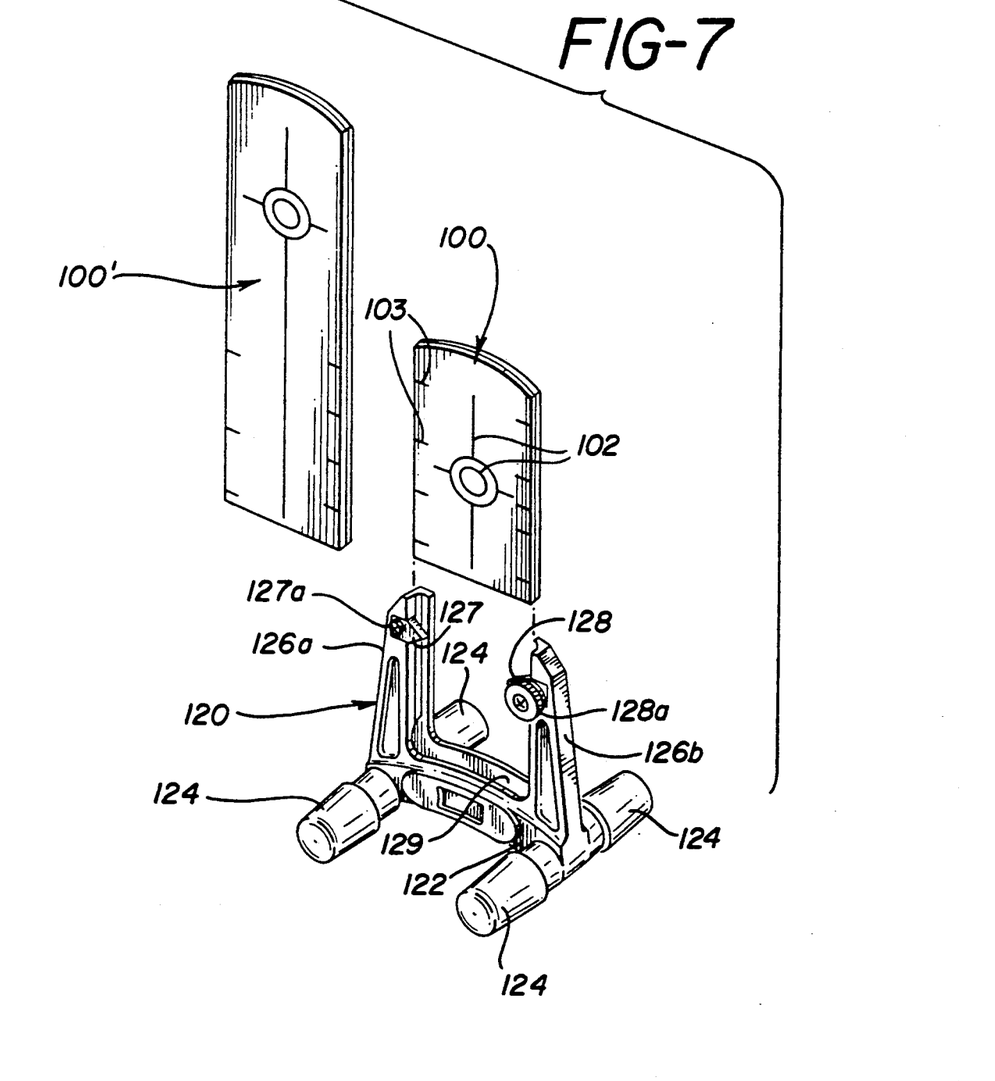
FIG. 7 is a perspective view of the stand used to support the laser target of the first embodiment of the present invention.

Referring to FIG. 7, the stand 120 for supporting and positioning the target 100 will now be discussed in detail. The stand 120 comprises a frame 122 having a plurality of feet 124 at one end, and first and second supporting arms 126a and 126b, respectively, at its opposite end. A support arrow 127 is secured to the first arm 126a by a screw 127a, and a locking arrow 128 is secured to the second arm 126b by an adjustable screw 128a. The support arrow 127, the locking arrow 128 and the arms 126a and 126b form a seat or recess 129 for receiving the target 100. When the target 100 is properly positioned within the recess 129, the adjustable screw 128a is manually tightened to lock the target 100 in the stand 120. The stand 120 can also be used to support the modified target 100'.

The positioning indicia 103 provided on the target 100 is used to properly locate the target 100 within the recess 129. The positioning indicia 103, as best shown in FIGS. 2 and 5, comprises a plurality reference lines and associated reference numerals. Each reference line and associated reference numeral represents the inner diameter of a different pipe section 150. The target 100 is properly positioned in the recess 129 when one of the arrows 127 or 128 points to the line representing the inner diameter of the pipe section 150 about to be positioned.

Referring to FIGS. 3, 3a and 4, an example of the laser target 100 formed in accordance with the first embodiment of the present invention will now be described. The target 100 includes a main body portion 104 having a thickness T=0.062". Each projection has a length Lp=0.022", and includes an arcuate portion 110b having a radius of curvature Ra=0.062"; an interconnecting portion 110c having a radius of curvature Ri=0.004"; and a flat portion 110a which is formed with an angle of inclination A=2° from horizontal. Each valley or groove 111 positioned between the projections 110 includes a radius of curvature Rg=0.003". The grooves 111 are separated from one another by a distance P=0.026". The cover portion 114 is formed having a first thickness Tf=0.187"; a second thickness Ts=0.155"; a third thickness Tt=0.125"; and, an inner thickness Ti=0.105". This target 100 is capable of directing a substantial portion of a beam of light 130 passing therethrough away from its path of travel 132 upwardly into approximately a 60°-85° vertical angle viewing range, as shown in FIG. 1. This permits a worker viewing the target 100 to easily determine when the reference beam of light 130 is in alignment with the appropriate reference indicia 102 on the target 100.

Figure 8:
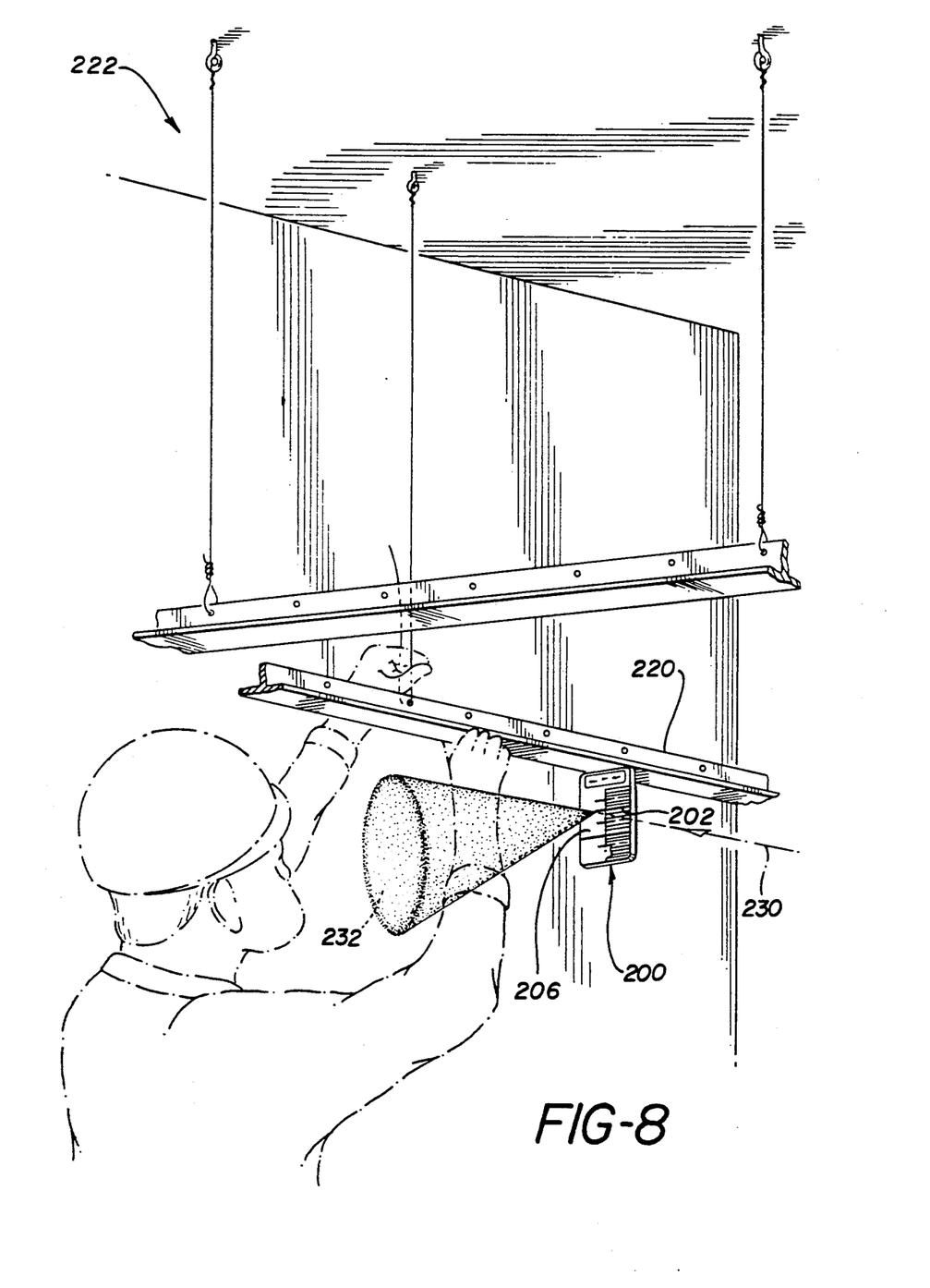
FIG. 8 is a pictorial view of a work site showing a second embodiment of a laser target of the present invention placed on a ceiling grid being mounted in a building under construction.
Figure 9:
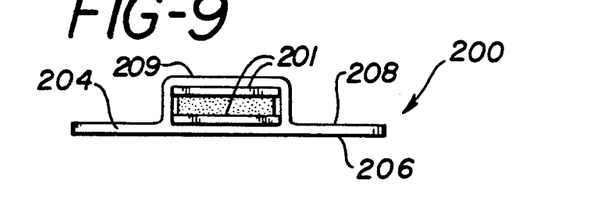
FIG. 9 is a top plan view of the laser target shown in FIG. 8.
Figure 12:
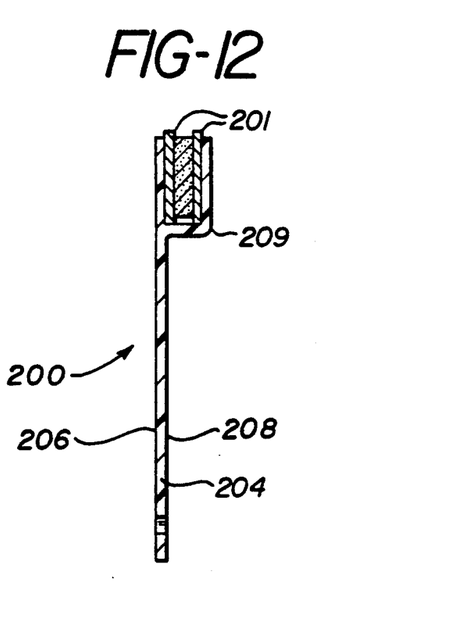
FIG. 12 is a cross-sectional view taken generally along section line 12—12 in FIG. 11.

Referring now to FIG. 8, a second embodiment of a laser beam target of the present invention, generally designated by the reference numeral 200, is shown mounted to a hanging ceiling grid 220 being placed in a building 222 under construction. The target 200 is mounted to the grid 220 by a magnet 201, best shown in FIGS. 9 and 12. A projector (not shown) provides a rotating horizontal laser beam of light 230 which establishes a continuous, visible plane of light over the entire work area. Workers in the building 222 are able to level and locate the ceiling grid 220 at its proper position by lining up the beam 230 with reference indicia 202 located on the target 200.

The target 200 includes a main body portion 204 having substantially planar first and second surfaces 206 and 208, respectively, as best shown in FIGS. 9-12. The body 204 includes a magnet receiving portion 209 extending from the second surface 208. The magnet 201 is molded in place in the receiving portion 209 when the main body portion 204 is formed. The main body portion 204 may be molded or formed from the materials discussed above with respect to the first embodiment of the present invention.

Figure 10:
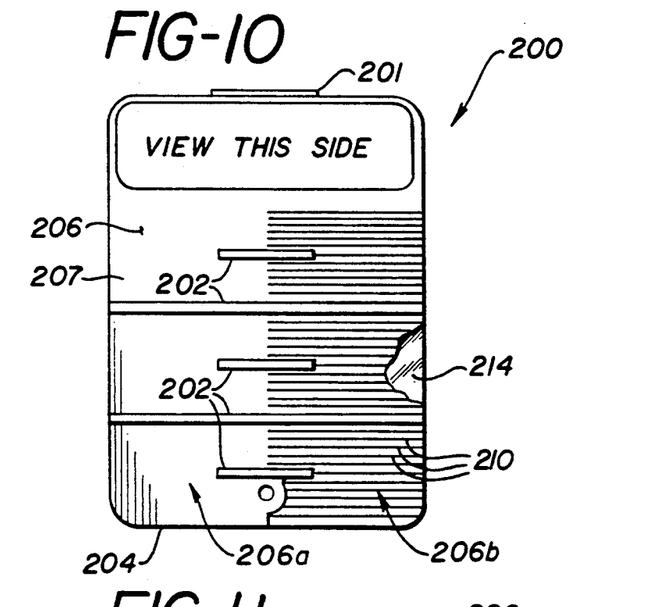
FIG. 10 is a front elevational view of the laser target shown in FIG. 8.
Figure 11:
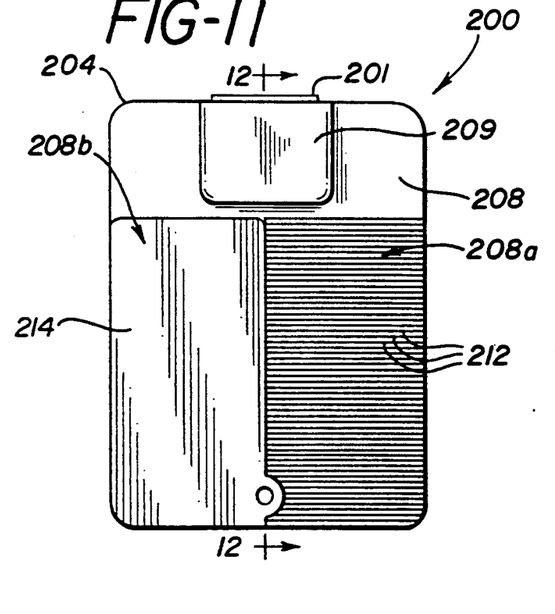
FIG. 11 is a rear elevational view of the laser target shown in FIG. 8.

The first surface 206 is divided into adjacent first and second sections 206a and 206b, respectively, as best shown in FIG. 10. The second surface 208 is divided into adjacent third and fourth sections 208a and 208b, respectively, as best shown in FIG. 11. The first section 206a and the third section 208a are substantially coextensive and backed upon one another, while the second section 206b and the fourth section 208b are substantially coextensive and backed upon one another.

The first section 206a preferably comprises a textured surface 207, also referred to herein as diffusing means which serves to diffuse or spread the beam of light 230 passing through the first section 206a into a cone-shaped beam 232, as shown in FIG. 8. This provides an angular viewing range from side-to-side. The third section 208a includes a plurality of second projections 212 formed thereon which serve to refract rays of the beam of light 230 passing through the first and third sections 206a and 208a downwardly into a specific range of viewing angles, as shown in FIG. 8.

The second section 206b preferably includes a plurality of first projections 210 formed thereon which serve to refract rays of a beam of light passing through the second section 206b downwardly into a specific range of vertical viewing angles. The fourth section 208b has reflecting means secured thereto, such as an adhesively bonded sheet of reflective tape 214, which serves to reflect a beam of light back toward the second section 206b after the beam has first passed through the second section 206b.

Figure 13:
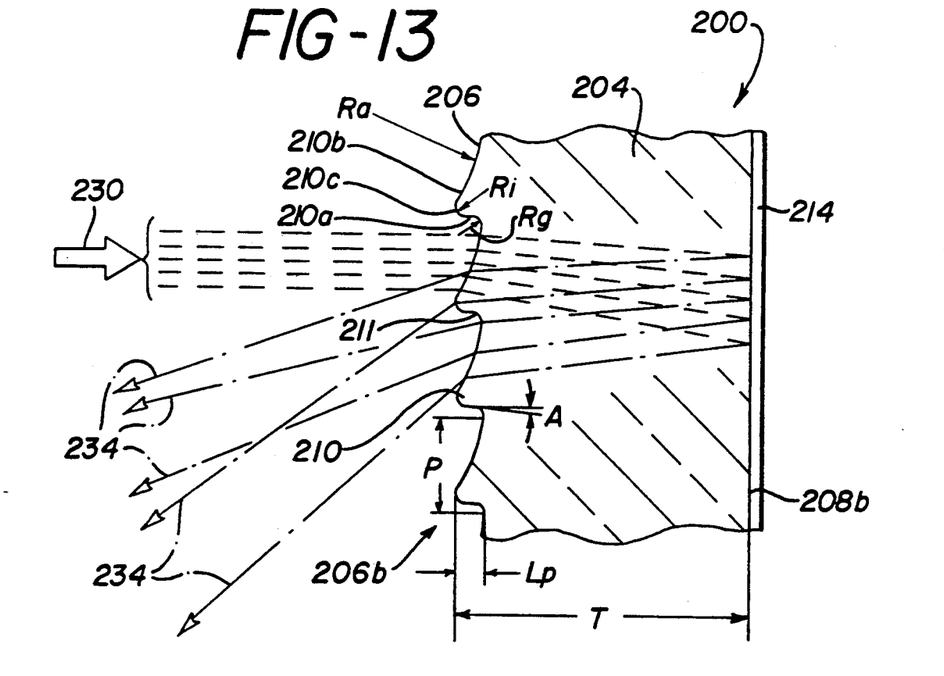
FIG. 13 is an enlarged cross-sectional view of a portion of the first projections located on the second section of the laser target shown in FIG. 8.

Referring to FIG. 13, each of the first projections 210 includes a substantially flat portion 210a, an opposed arcuate portion 210b, and a peak interconnecting portion 210c interposed therebetween. The arcuate portion 210b includes a radius of curvature Ra causing rays 234 of the beam of light 230 to be refracted downwardly into a specific range of vertical viewing angles as the rays 234 pass from the second section 206b. As should be apparent to one skilled in the art, by changing the shape and size of the first projections 210, one can cause the rays of the laser beam to be reflected and/or refracted into different specific viewing angle ranges.

Figure 14:
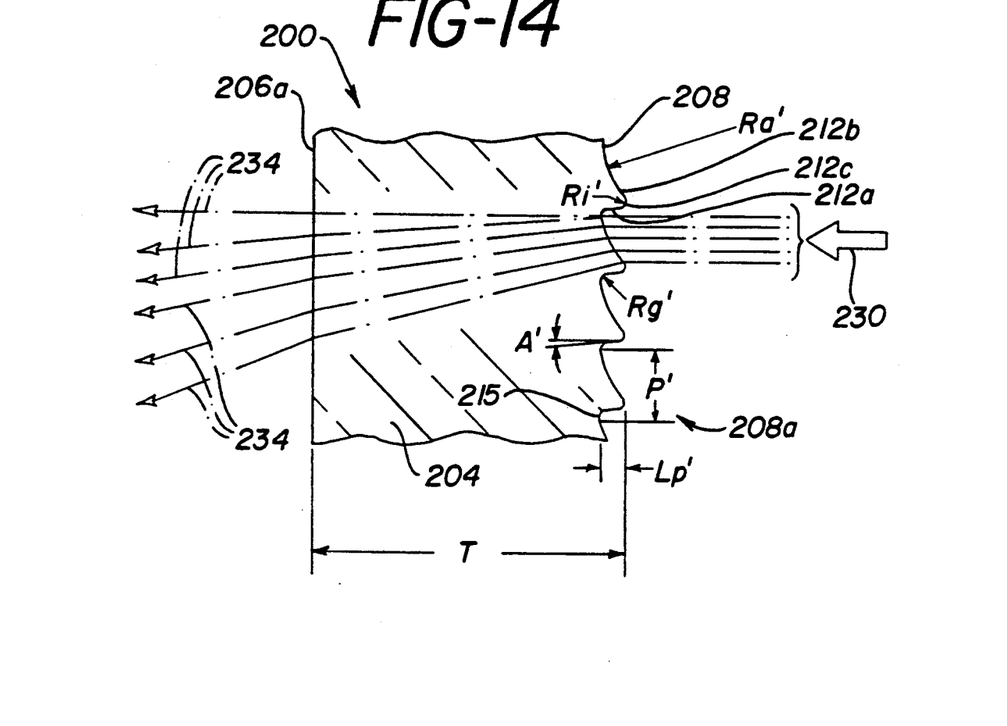
FIG. 14 is an enlarged cross-sectional view of a portion of the second projections located on the third section of the laser target shown in FIG. 8.

Referring to FIG. 14, each of the second projections 212 includes a substantially flat portion 212a, an opposed arcuate portion 212b, and a peak interconnecting portion 212c interposed therebetween. The arcuate portion 212b includes a radius of curvature Ra' causing rays 234 of the beam of light 230 to be refracted downwardly into a specific range of vertical viewing angles as the rays 234 pass from the first section 206a. As should be apparent to one skilled in the art, by changing the shape and size of the second projections 212, one can cause the rays of the laser beam to be reflected and/or refracted into different viewing angle ranges.

In use, the first surface 206 is always positioned to face a worker viewing the target 200. As can be seen from FIG. 13, when the first surface 206 is positioned to face the incoming beam of light 230, the first projections 210 act to refract the rays 234 of the beam 230 downwardly as the beam 230 passes into the target 200 through the second section 206b. The rays 234 are then reflected back toward the second section 206b by the reflective tape 214 secured to the fourth section 208b and are again refracted downwardly by the first projections 210 as they exit the target 200 through the second section 206b. As can be seen from FIGS. 8 and 14, when the second surface 208 is positioned to face the incoming beam 230, the second projections 212 act to refract the rays 234 of the beam 230 downwardly. This occurs only when the beam first passes through the third section 208a and then out from the first section 206a.

Consequently, if a worker is facing the first surface 206 of the target 200 and has his back positioned to the projector (not shown) providing the beam 230, he will view the second section 206b when lining up the beam 230 with the indicia 202 on the target 200. If, however, the worker is facing both the target 200 and the projector, as shown in FIG. 8, he will view the first section 206a when lining up the beam 200 with the indicia 202 on the target 200.

Referring to FIGS. 13 and 14, an example of the laser target 200 formed in accordance with the second embodiment of the present invention will now be described. The target 200 includes a main body portion 204 having a thickness T=0.08". Each of the first projections 210 on the second section 206b has a length Lp=0.009", and includes an arcuate portion 210b having a radius of curvature Ra=0.062"; an interconnecting portion 110c having a radius of curvature Ri=0.004"; and a flat portion 110a which is formed having an angle of inclination A=2° from horizontal. Each valley or groove 211 positioned between the projections 210 includes a radius of curvature Rg=0.004". The grooves 211 are separated from one another by a distance P=0.030". Each of the second projections 212 on the third section 208a has a length Lp' =0.008", and includes an arcuate portion 212b having a radius of curvature Ra'=0.031"; an interconnecting portion 212c having a radius of curvature Ri'=0.004"; and a flat portion 212a which is formed having an angle of inclination A'=2° from horizontal. Each valley or groove 215 positioned between the projections 212 includes a radius of curvature Rg'=0.004". The grooves 215 are separated from one another by a distance P'=0.020". This target 200 is capable of directing a major portion of a beam of light passing through either the first or second projections 210 or 212 away from its path of travel into approximately a 0°-30° vertical angle viewing range, as shown for example in FIG. 8. This permits a worker viewing the target 200 to easily determine when the reference beam of light 230 is in alignment with appropriate reference indicia 202 on the target 200.

By the present invention, it is now possible for a worker to more easily determine when a rotating laser beam or a reference line of light is in alignment with reference indicia on a laser target. Consequently, if a laser target is mounted on an overhead ceiling grid, a worker lining up the target with the laser beam may now position himself beneath the plane in which the beam of light is being rotated. Further, if a target is mounted in a pipe, a worker lining up the target with the reference line of light may now position himself above the path of travel of the reference light.

Having described the invention in detail and by reference to preferred embodiments thereof, it will be apparent that modifications and variations are possible without departing from the scope of the invention defined in the appended claims. For example, it is contemplated by this invention that a laser beam target could be constructed having light diverting means comprising a mirror connected to one of the two outer planar surfaces of the main body portion for directing rays of a beam of light into a specific range of viewing angles. It is additionally contemplated that the main body portion of a laser beam target made in accordance with the present invention could include a plurality of triangular-shaped recesses or openings formed within the main body portion for refracting rays of a laser beam of light into a specific range of viewing angles. It is further contemplated that the main body portion of a laser beam target constructed in accordance with the present invention could include a plurality of triangular-shaped pieces of material, e.g., glass pieces, having a higher index of refraction than the material comprising the main body portion, embedded within the main body portion for refracting rays of a beam of light into a specific range of viewing angles.

What is claimed is:

1. A reference target for use with a projector capable of emitting a reference beam of light along a predetermined path comprising:
    a body having first and second substantially planar surfaces, said reference beam of light passing through said first and second surfaces when said body enters into the path of said beam of light; and
    light diverting means on at least one of said first and second surfaces of said body for directing a substantial portion of said beam of light away from said path as said beam of light passes from said body and into a specific range of viewing angles originating at a location generally on or closely adjacent to said predetermined path of said beam of light, said specific range of viewing angles being directed toward a worker's position out of said predetermined path of said beam of light.

2. A reference target as set forth in claim 1, wherein said body is formed from a substantially transparent material.

3. A reference target as set forth in claim 1, wherein said body is formed from a polymeric material.

4. A reference target as set forth in claim 3, wherein said polymeric material is selected from the group consisting of acrylic resins and polycarbonates.

5. A reference target as set forth in claim 1, wherein said light diverting means comprises a plurality of projections located on said at least one of said first and second surfaces for refracting said portion of said beam of light into said specific range of viewing angles.

6. A reference target as set forth in claim 5, wherein each of said projections includes a substantially flat portion, an opposed arcuate portion, and a peak interconnecting portion interposed therebetween, said arcuate portion having a radius of curvature causing rays of said portion of said beam of light to be refracted into said specific range of viewing angles.

7. A reference target as set forth in claim 1, wherein:
    said first surface is divided into first and second sections, and said second surface is divided into third and fourth sections, said first and third sections being substantially coextensive and backed upon one another, and said second and fourth sections being substantially coextensive and backed upon one another;
    means located on said fourth section for reflecting said portion of said beam of light away from said fourth section after said portion of said beam of light passes through said second section; and
    said light diverting means comprising a plurality of first projections located on said second section and a plurality of second projections located on said third section, said first projections refracting said portion of said beam of light into said specific range of viewing angles when said first surface is positioned to face said beam of light and after said beam passes through said second section and is reflected back toward said second section by said reflecting means on said fourth section, and said second projections refracting said portion of said beam of light into said specific range of viewing angles when said second surface is positioned to face said beam of light and said portion of said beam of light passes through said third section and out from said first section.

8. A reference target as set forth in claim 7, further including means located on said first section for diffusing said beam of light into a substantially cone-shaped beam.

9. A reference target as set forth in claim 1, wherein said light diverting means comprises a plurality of projections located on one of said first and second surfaces for reflecting and refracting said portion of said beam of light into said specific range of viewing angles.

10. A reference target as set forth in claim 9, wherein each of said projections includes a substantially flat portion, an opposed arcuate portion, and a peak interconnecting portion interposed therebetween, said arcuate portion having a radius of curvature causing rays of said portion of said beam of light to be internally reflected upwardly toward said flat portion where said rays are refracted into said specific range of viewing angles as they exit through said flat portion.

11. A reference target as set forth in claim 10, further including means located on the other of said first and second surfaces of said body for diffusing said beam of light into a substantially cone-shaped beam.

12. A reference target as set forth in claim 11, wherein said diffusing means comprises a textured surface on the other of said first and second surfaces.

13. A reference target as set forth in claim 1, further including means connected to said body for covering and protecting said light diverting means.

14. A laser target for use with a projector capable of providing a reference laser beam of light along a predetermined path comprising:
a body having first and second surfaces, said reference beam of light passing through said first and second surfaces when said body enters into the path of said beam of light; and
light diverting means associated with said body for directing a substantial portion of said beam of light into a plurality of specific directions away from said path as said beam of light passes from said body, said plurality of specific directions originating at a location generally on or closely adjacent to said predetermined path of said beam of light and being directed toward a worker's position out of said predetermined path of said beam of light.

15. A reference target as set forth in claim 14, wherein said body is formed from a polymeric material.

16. A reference target as set forth in claim 14, wherein said light diverting means comprises a plurality of projections located on at least one of said first and second surfaces for refracting said portion of said beam into said plurality of specific directions.

17. A reference target as set forth in claim 16, wherein each of said projections includes a substantially flat portion, an arcuate portion, and a peak portion interposed therebetween, said arcuate portion having a radius of curvature causing rays of said portion of said beam of light to be refracted into plurality of specific directions.

18. A reference target as set forth in claim 14, wherein:
said first surface is divided into first and second sections, and said second surface is divided into third and fourth sections, said first and third sections being substantially coextensive and backed upon one another, and said second and fourth sections being substantially coextensive and backed upon one another;
means located on said fourth section for reflecting said portion of said beam of light away from said fourth section after said portion of said beam of light passes through said second section; and
said light diverting means comprising a plurality of first projections located on said second section and a plurality of second projections located on said third section, said first projections acting to refract said portion of said beam of light into said plurality of specific directions when said first surface is positioned to face said beam of light and after said beam passes through said second section and is reflected back toward said second section by said reflecting means on said fourth section, and said second projections acting to refract said portion of said beam of light into said plurality of specific directions when said second surface is positioned to face said beam of light and said portion of said beam of light passes through said third section and out from said first section.

19. A reference target as set forth in claim 18, further including means located on said first section for diffusing said beam of light into a substantially cone-shaped beam.

20. A reference target as set forth in claim 14, wherein said light diverting means comprises a plurality of projections located on one of said first and second surfaces for reflecting and refracting said portion of said beam of light into said plurality of specific directions.

21. A reference target as set forth in claim 20, wherein each of said projections includes a substantially flat portion, an arcuate portion, and a peak interconnecting portion interposed therebetween, said arcuate portion having a radius of curvature causing rays of said portion of said beam of light to be internally reflected upwardly toward said flat portion where said rays are refracted into said plurality of specific directions as they exit through said flat portion.

22. A reference target as set forth in claim 21, further including means located on the other of said first and second surfaces of said body for diffusing said beam of light into a substantially cone-shaped beam.

23. A reference target as set forth in claim 14, further including means connected to said body for covering and protecting said light diverting means.

24. A reference target for use with a projector capable of emitting a reference beam of light along a first path comprising:
a body having first and second surfaces, said reference beam of light passing through said first and second surfaces when said body enters into the path of said beam of light; and
light diverting means associated with said body for directing at least a portion of said beam of light away from said first path as said beam of light passes from said body and into a second path originating at a location generally on or closely adjacent to said first path of said beam of light and oriented within a specific range of viewing angles relative to said first path, said specific range of viewing angles being directed toward a worker's position out of said first path of said beam of light.

* * * * *

UNITED STATES PATENT AND TRADEMARK OFFICE
CERTIFICATE OF CORRECTION

PATENT NO. : 5,095,629
DATED : March 17, 1992
INVENTOR(S) : Daniel R. Klemer et al It is certified that error appears in the above-identified patent and that said Letters Patent is hereby corrected as shown below:

Col. 11, line 41,    "into plurality" should read --into said plurality--.

Signed and Sealed this

Fifteenth Day of June, 1993

Attest:

MICHAEL K. KIRK

*Attesting Officer*    Acting Commissioner of Patents and Trademarks